United States Patent [19]
Barker

[11] 3,898,795
[45] Aug. 12, 1975

[54] FUEL SUPPLY SYSTEMS FOR ENGINES

[75] Inventor: Barrie Gilbert Barker, London, England

[73] Assignee: Simms Group Research & Development Ltd., Birmingham, England

[22] Filed: Dec. 21, 1973

[21] Appl. No.: 427,117

[30] Foreign Application Priority Data
Dec. 23, 1972 United Kingdom............ 59587/72

[52] U.S. Cl............................................ 60/39.28 R
[51] Int. Cl............................................. F02c 9/10
[58] Field of Search............................. 60/39.28 R

[56] References Cited
UNITED STATES PATENTS

| | | | |
|---|---|---|---|
| 3,078,670 | 2/1963 | Werner | 60/39.28 R |
| 3,236,047 | 2/1966 | Stresen-Reuter | 60/39.28 R |
| 3,246,682 | 4/1966 | McCombs | 60/39.28 R |
| 3,360,199 | 12/1967 | Sharpe | 60/39.28 R |
| 3,368,349 | 2/1968 | Johnson | 60/39.28 R |
| 3,390,522 | 7/1968 | Whitehead | 60/39.28 R |
| 3,514,946 | 6/1970 | Warne | 60/39.28 R |
| 3,585,796 | 6/1971 | Lewis | 60/39.28 R |
| 3,780,527 | 12/1973 | Lewis | 60/39.28 R |

*Primary Examiner*—Clarence R. Gordon
*Attorney, Agent, or Firm*—Holman & Stern

[57] ABSTRACT

A fuel supply system for a gas turbine engine comprises an engine driven fuel pump of the constant displacement type, a spill valve for spilling fuel between the inlet and the outlet of the pump and a spray nozzle which is connected to the outlet of the pump. A regulating valve is provided to control the pressure at the outlet of the pump, and means is provided for controlling the setting of the spill valve in accordance with various engine control parameters.

2 Claims, 1 Drawing Figure

3,898,795
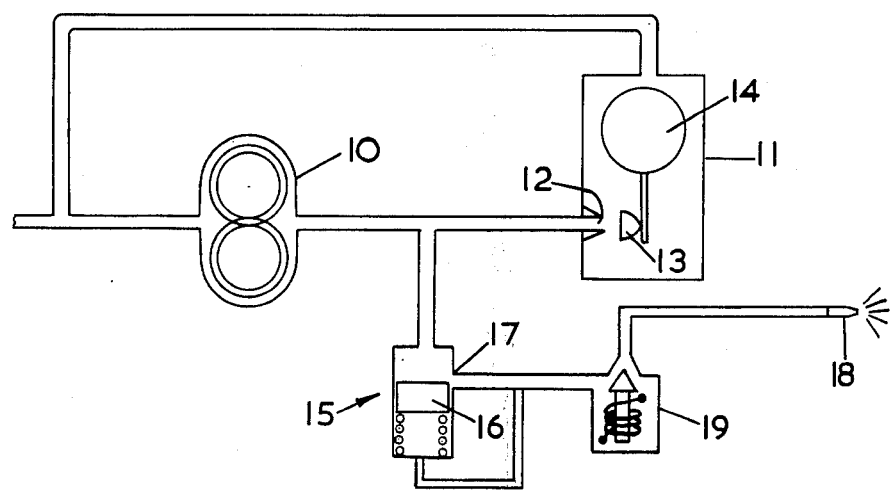

FUEL SUPPLY SYSTEMS FOR ENGINES

This invention relates to a fuel system for a gas turbine engine and has for its object to provide such a system in a simple and convenient form.

A fuel supply system in accordance with the invention comprises in combination, an engine driven fuel pump having a delivery volume which varies in proportion to engine speed, a spill valve for spilling fuel between the inlet and outlet of the pump, the outlet of the pump being connected to a spray nozzle disposed to direct fuel into a combustion space of the engine, a regulating valve for influencing the pressure at the outlet of the pump and means for controlling the setting of the spill valve in accordance with various engine control parameters, the arrangement being such that the quantity of fuel delivered to the engine depends upon the speed of the engine and the setting of the spill valve.

Preferably the regulating valve is disposed between the outlet of the pump and the aforesaid spray nozzle.

One example of a fuel supply system in accordance with the invention will now be described with reference to the accompanying diagrammatic drawing in which there is indicated a gear pump 10 which is driven by the engine at a speed proportional to the speed of the shaft of the engine which interconnects a gasifier turbine and the compressor of the engine, the engine having a separate work turbine for connection to a load. The volume of fuel which is delivered by the fuel pump is proportional to the speed at which it is driven, and it will be appreciated that any other constant displacement pump could be utilised in this position.

The outlet of the gear pump is connected to a spill valve 11 which includes an orifice 12 controlled by a valve element 13. The valve element is mounted upon an arm which is connected to a torque motor 14, and the fuel which manages to flow through the orifice 12 is returned to the inlet of the pump. A branch passage extends from the passage which interconnects the outlet of the pump with the orifice 12, and this branch passage communicates with a regulating valve 15 having a pressure responsive valve element 16 which with increasing pressure, increases the size of a regulating orifice 17 formed in the wall of the cylinder in which the member 16 is mounted. The member 16 is loaded by a coiled compression spring in a direction to reduce the size of the metering orifice.

The metering orifice communicates with a spray nozzle 18 which is positioned to direct fuel into a combustion chamber of the engine, and interposed between the spray nozzle 18 and the orifice 17 is a shut-off valve 19 which is controlled electrically and which is spring loaded towards the closed position.

In operation, the quantity of fuel which is supplied to the spray nozzle 18 depends upon the speed of the engine, and the setting of the spill valve. When maximum fuel is required the spill valve is closed and all the fuel delivered by the pump will flow to the nozzle 18. As the spill valve is opened, the amount of fuel flowing to the nozzle 18 will be reduced. Moreover, as the spill valve is opened the pressure at the outlet of the pump will fall, and as a result the element 16 under the action of its spring, will assume a new position thereby altering the size of the metering orifice 17.

When the spill valve is fully open, then the minimum volume of fuel will flow to the engine and the actual volume depends upon the characteristics of the valve 15. The shape of the orifice 17, together with the rate of the spring, can be altered as required to obtain the desired minimum flow characteristic.

The torque motor 14 is supplied with an electrical signal indicative of various engine control parameters. The signal is derived from an electronic control system which is supplied with information relating to the parameters, and which effects an adjustment in the setting of the spill valve so that the engine is working under the desired conditions.

I claim:

1. A fuel supply system for a gas turbine engine comprising in combination, an engine driven fuel pump having a delivery volume which varies in proportion to engine speed, a spill valve for spilling fuel between the inlet and outlet of the pump, the outlet of the pump being connected to a spray nozzle disposed to direct fuel into a combustion space of the engine, a regulating valve disposed between the spray nozzle and the outlet of the pump and means for controlling the setting of the spill valve in accordance with various engine control parameters, the arrangement being such that the quantity of fuel delivered to the engine depends upon the speed of the engine and the setting of the spill valve, said regulating valve including a pressure responsive valve element subjected to the outlet pressure of the pump and movable by this pressure against the action of resilient means, said regulating valve including an orifice through which fuel flows to said nozzle, said valve member being moved against the action of the spring to increase the size of said orifice with increasing pressure at the outlet of the pump, the valve element also being responsive to the pressure at the nozzle, this pressure assisting the action of said resilient means.

2. A system as claimed in claim 1 including a stop valve interposed between the regulating valve and the nozzle.

* * * * *